(12) United States Patent
Harayama et al.

(10) Patent No.: US 8,953,123 B2
(45) Date of Patent: *Feb. 10, 2015

(54) LIQUID CRYSTAL DISPLAY DEVICE

(75) Inventors: Takeshi Harayama, Mobara (JP); Takashi Yoshimoto, Mobara (JP); Katsuhiko Ishii, Chosei (JP); Setsuo Kobayashi, Mobara (JP); Akira Ishii, Mobara (JP); Shinji Tanabe, Mobara (JP); Kiyoshi Sento, Sakura (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,358

(22) Filed: Feb. 2, 2012

(65) Prior Publication Data

US 2012/0200796 A1    Aug. 9, 2012

(30) Foreign Application Priority Data

Feb. 7, 2011   (JP) ................. 2011-023917

(51) Int. Cl.
*G02F 1/1333* (2006.01)
*G02F 1/1335* (2006.01)

(52) U.S. Cl.
CPC .... *G02F 1/133308* (2013.01); *G02F 1/133512* (2013.01); *G02F 2001/133331* (2013.01); *G02F 2202/023* (2013.01); *G02F 2202/28* (2013.01)
USPC .................. 349/110; 349/58; 349/61; 349/96

(58) Field of Classification Search
None
See application file for complete search history.

(56) References Cited

U.S. PATENT DOCUMENTS

| 6,954,243 | B2 * | 10/2005 | Ota et al. | 349/110 |
| 7,764,333 | B2 * | 7/2010 | Kim | 349/58 |
| 8,284,344 | B2 * | 10/2012 | Harada | 349/58 |

(Continued)

FOREIGN PATENT DOCUMENTS

TW   201024866   7/2010

OTHER PUBLICATIONS

Dictionary definitions from Merriam-Webster.com of the terms "adhesive," "bond," and "bonding"; Dictionary definition from thefreedictionary.com of the term "adhesive".*

(Continued)

*Primary Examiner* — Bumsuk Won
*Assistant Examiner* — Angela Davison
(74) *Attorney, Agent, or Firm* — Antonelli, Terry, Stout & Kraus, LLP.

(57) ABSTRACT

In a liquid crystal display device having a front window, light from a backlight is prevented from leaking through chamfered edges of the front window. An upper polarizing plate is formed on an opposing substrate and a light shielding material is formed abutting on an outer edge of the upper polarizing plate. Edges of the upper polarizing plate are located inward of edges of the front window. The upper polarizing plate and the front window are bonded with a boding material including an ultraviolet curable resin. The ultraviolet curable resin also lies over the light shielding material. Chamfers are formed in the front window and the ultraviolet curable resin does not adhere to the chamfers of the front window. By this structure, light from the backlight is prevented from entering the internal part of the front window through the chamfers of the front window and light leakage is prevented.

7 Claims, 9 Drawing Sheets

(56) References Cited

U.S. PATENT DOCUMENTS

| | | |
|---|---|---|
| 2003/0081151 A1* | 5/2003 | Tsuchihashi et al. ........... 349/61 |
| 2005/0151899 A1 | 7/2005 | Chou |
| 2008/0153377 A1 | 6/2008 | Kobayashi |
| 2009/0002607 A1* | 1/2009 | Kubota et al. ................... 349/96 |
| 2010/0165603 A1 | 7/2010 | Sun et al. |
| 2010/0231821 A1 | 9/2010 | Tsuji |
| 2010/0245707 A1 | 9/2010 | Harada |
| 2010/0296027 A1* | 11/2010 | Matsuhira et al. .............. 349/96 |

OTHER PUBLICATIONS

Definition of "front." The American Heritage Dictionary of the English Language, Fourth Edition, updated in 2009, published by Houghton Mifflin, as downloaded from www.thefreedictionary.com on Aug. 12, 2013.*

Definition of "window." The American Heritage Dictionary of the English Language, Fourth Edition, updated in 2009, published by Houghton Mifflin, as downloaded from www.thefreedictionary.com on Aug. 12, 2013.*

* cited by examiner

A-A

LIQUID CRYSTAL DISPLAY DEVICE

CLAIM OF PRIORITY

The present application claims priority from Japanese Patent Application JP 2011-023917 filed on Feb. 7, 2011, the content of which is hereby incorporated by reference into this application.

FIELD OF THE INVENTION

The present invention relates to a liquid crystal display device and particularly to a technique for improving the strength and visibility of a miniature display device for use in a digital still camera, a cell phone, etc.

BACKGROUND OF THE INVENTION

In a liquid crystal display device, a TFT substrate over which pixel electrodes and thin-film transistors (TFTs), inter alia, are formed in a matrix and an opposing substrate over which color filters, inter alia, are formed in positions corresponding to the pixel electrodes in the TFT substrate are placed facing each other and liquid crystals are sandwiched between the TFT substrate and the opposing substrate. An image is produced by controlling light transmissibility through liquid crystal molecules pixel by pixel.

An upper polarizing plate is attached to the upper surface of the opposing substrate and the upper polarizing plate is prone to damage because it is made of resin. As a countermeasure against this, a front window made of glass is often put over the opposing substrate. An arrangement is used in which the front window is positioned apart from the liquid crystal display panel in order to provide mechanical protection for the liquid crystal display panel, as shown in FIG. 8.

In the case of related art as typified in FIG. 8, a problem of ghost image appearance arises. FIG. 8 is an explanatory diagram about ghost image appearance, taking a reflective liquid crystal display panel as an example. In FIG. 8, an incoming external light beam L passes through the front window 30 and is reflected by the liquid crystal display panel. After passing back through the front window 30 again, it enters a human eye. Although the external light beam L is refracted by the front window 30, this refraction is here ignored in FIG. 8.

A part of the light beam reflected at a point P1 on the front surface of the liquid crystal display panel is reflected back by the undersurface Q1 of the front window 30 and comes at and is reflected again by a point P2 on the front surface of the liquid crystal display panel. When the human views the light beam reflected by the point P2, the phenomenon of ghost image appearance takes place. Although FIG. 8 explains ghost image appearance taking the reflective liquid crystal display panel as an example, this is also true for a transmissive type. That is, in the transmissive type, when a light beam transmitted through the liquid crystal display panel travels at the same angle as the light beam reflected at the point P1 on the front surface of the liquid crystal display panel, it is reflected back by the undersurface Q1 of the front window 30 and follows the same path as shown for the reflective type. This phenomenon of ghost image appearance deteriorates image quality.

Another problem that is encountered by a liquid crystal display panel is that light is reflected from the edge faces of the TFT substrate 10 and the opposing substrate 20 and radiated from the display region, which degrades the contrast of the screen. To take a countermeasure against this problem, "Japanese Published Unexamined Patent Application No. 2003-5160" discloses an arrangement in which the edge faces of the TFT substrate 10 and the opposing substrate 20 are shielded from light to prevent light reflection from the edge faces. In "Japanese Published Unexamined Patent Application No. 2003-5160", however, there is no disclosure about the front window and there is no description about light leakage in the margins of the screen due to the front window.

SUMMARY OF THE INVENTION

In order to solve the problem discussed with respect to FIG. 8, it is advisable to bond the front window 30 and the opposing substrate 20 with a bonding material having the same degree of refractive index as glass. FIG. 7 is a cross-sectional view representing a liquid crystal display panel having such a structure. In FIG. 7, a liquid crystal layer 100 is sandwiched between the TFT substrate 10 and the opposing substrate 20, and the edges of the liquid crystal layer are sealed by a sealing material 15. A black matrix 22 is formed in the opposing substrate 20. In frame-like portions occupied by the sealing material 15, the black matrix 22 is not formed to prevent peel-off of the sealing material 15. In the portions where no black matrix is formed, the light of a backlight may leak into the front surface. A lower polarizing plate 11 is attached to the TFT substrate 10, while an upper polarizing plate 21 is attached to the opposing substrate 20. A backlight 200 is located under the TFT substrate 10. The backlight 200 and the liquid crystal display panel are accommodated in a bottom frame 120 made of a metal.

The upper polarizing plate 21 and the front window 30 are bonded with a bonding material 40 which is an UV (ultraviolet) curable resin. The front window 30 is provided with a light shielding print 32 in its margins to block out light from its periphery. Moreover, in order to block out light from outside the edges of the front window 30, a light shielding tape 60 shaped for marginal edges is placed in the periphery of the front window 30. In spite of this structure, a light beam from the backlight 200 can reach the margins of the screen, as indicated by an arrow. More specifically, the front window 30 is provided with chamfers 31 in its edges. The bonding material 40 abuts on the chamfered edges 31. Because the refractive index of the bonding material 40 is nearly equal to that of glass, incoming light in the chamfered edges 31 reaches the margins of the front window 30 without being reflected and refracted. This transmitted light deteriorates contrast in the margins of the screen.

Such light that is emitted from the margins of the screen poses no problem, if a viewing angle $\theta 1$ which is shown in FIG. 9 is more or less 60 degrees. Recently, however, there is a demand for a product with a viewing angle $\theta 2$ that is close to 180 degrees, particularly, like a digital still camera (DSC). In such a case, incoming light in the margins of the front window 30, as indicated by the arrow in FIG. 7, poses a problem. Although the polarizing plate 21 is present under the chamfered edges 31, it is difficult to block out leaked light only by the polarizing plate 21.

In fact, in the structure in which the front window 30 and the liquid crystal display panel are bonded with the bonding material 40, as shown in FIG. 7, a problem is the incoming light through the chamfered edges of the front window 30. In the structure in which the front window 30 is attached to the liquid crystal display panel with the bonding material 40, the present invention is intended to prevent light from the backlight 200 or external light from entering the margins of the front window 30 and to prevent contrast deterioration in the margins of the screen when the viewing angle is wide.

The prevent invention overcomes the above-noted problems and its typical means are as follows. There is provided a liquid crystal display device including a liquid crystal display panel that includes a TFT substrate having a matrix arrangement of pixel electrodes and TFTs for controlling signals to the pixel electrodes and an opposing substrate having color filters formed corresponding to the pixel electrodes, the TFT substrate being formed larger than the opposing substrate and a terminal section being formed in a portion where the opposing substrate does not extend over the TFT substrate. An upper polarizing plate is bonded to the opposing substrate and a light shielding material is laid in periphery of the upper polarizing plate and along and outside an outer edge of a side opposite to the terminal section. A front window is formed over the upper polarizing plate and edges of the upper polarizing plate are located inward of edges of the front window. The upper polarizing plate and the front window are bonded with a boding material made from an ultraviolet curable resin. The ultraviolet curable resin lies over the light shielding material. Chamfers are formed in the front window and the bonding material does not adhere to the chamfers.

Typical means in another aspect of the present invention reside in that a light shielding tape shaped for marginal edges is attached along and outside the outer edges of the front window and above the light shielding material in addition to the foregoing structure. The outer edges of the light shielding tape shaped for marginal edges are formed outward of the outer edges of the opposing substrate.

According to the present invention, in a liquid crystal display device having a front window, it is possible to block out light of a backlight that enters the front window through its chamfers. Hence, it is possible to prevent light leakage in the margins of the screen when the screen is viewed obliquely. Thus, a liquid crystal display device that provides a good contrast, even if the screen is viewed from an oblique direction, can be achieved.

DETAILED DESCRIPTION OF PREFERRED EMBODIMENTS

Details of the present invention are now disclosed in accordance with exemplary embodiments.

First Embodiment

Figure 1:
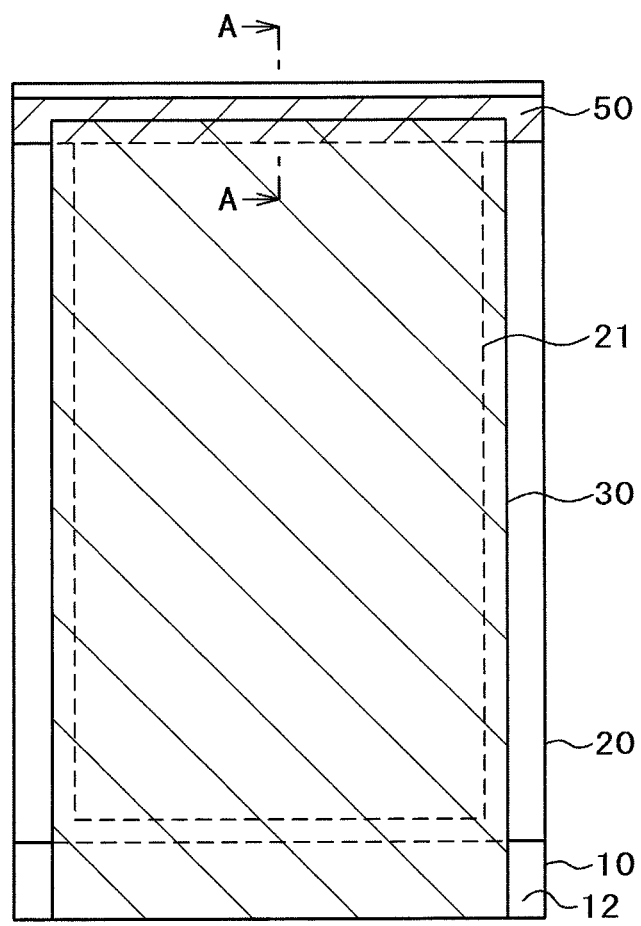
FIG. 1 is a plan view of a liquid crystal display device of a first embodiment.
Figure 2:
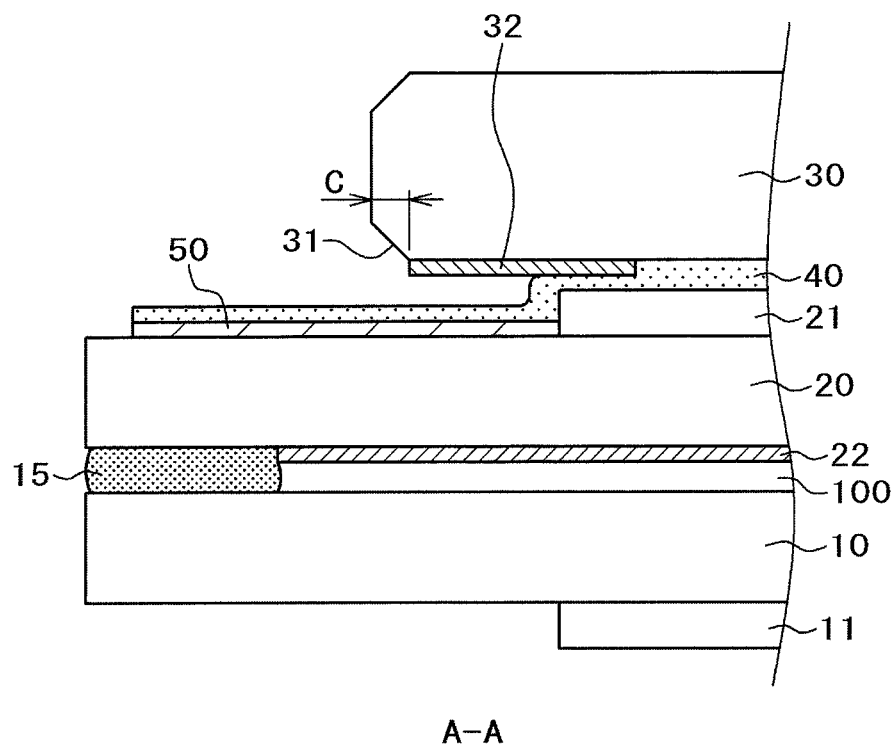
FIG. 2 is a cross-sectional view through line A-A in FIG. 1.

FIG. 1 is a plan view representing a first embodiment of the present invention and FIG. 2 is a cross-sectional view taken along line A-A in FIG. 1. In FIG. 1, a liquid crystal display panel is formed by a TFT substrate 10 and an opposing substrate 20. A lower polarizing plate 11 is attached to the TFT substrate 10, while an upper polarizing plate 21 is attached to the upper surface of the opposing substrate 20. A backlight 200 is located under the TFT substrate 10. The TFT substrate 10 is formed larger than the opposing substrate 20. A region where the TFT substrate 10 only extends is a terminal section 12 in which an IC driver and other components, which are not shown, are installed.

On top of the liquid crystal display panel and the upper polarizing plate 21, a front window 30 made of glass is attached. In FIG. 1, the outlines of the front window 30, its three sides with the exception of a side congruent with the terminal section 12 of the liquid crystal display panel, are smaller than the liquid crystal display panel. As explained with regard to FIG. 7, the front window 30 is provided with chamfers 31 through which light from the backlight enters the front window 30. The backlight 200 emits light from the back surface of the liquid crystal display panel toward the front surface and its light source is located near to a first side. The first side is the side where the IC driver is installed and the terminal section 12 is formed. The light source emits light through a lateral side of a light guide plate from the first side toward a second side opposite to the first side. Therefore, this phenomenon is marked particularly at a short side of the front window 30 opposite to the terminal section 12. This embodiment is arranged to block out light from the backlight by laying a light shielding material 50 along the short side opposite to the terminal section 12. The light shielding material 50 is laid flush with the upper polarizing plate 21. It is impossible to prevent light leakage sufficiently even by attaching a light shielding tape 60 on top of a bonding material 40. Light leakage can be prevented, even if the substrates 10, 20 are made thinner.

FIG. 2 is a cross-sectional view through line A-A in FIG. 1. In FIG. 2, the liquid crystal display panel that is formed by the TFT substrate 10 and the opposing substrate 20 is the same as explained with regard to FIG. 7 and, therefore, an explanation about the display panel is omitted. Again, the liquid crystal display panel and the backlight 200 are accommodated in the bottom frame 120, which is the same as in FIG. 7. In FIG. 2, the upper polarizing plate 21 is formed smaller than the front window 30. The upper polarizing plate 21 and the light shielding material 50 abut each other such that they are flush with each other. The front window 30 is provided with a light shielding print 32 in its margins. The front window 30 and the upper polarizing plate 21 are bonded with a UV bonding material 40. Because the UV bonding material 40 is fluid before curing, it can extend to cover even the light shielding material 50.

In FIG. 2, it is distinctive that the bonding material 40 does not abut on the chamfers 31 of the front window 30. Because an air layer is formed between the substrate 20 and the front window 30, leaked light that reaches the chamfers 31 is in part reflected by the boundary faces. In consequence, light leakage directed toward the display surface can be reduced. Another feature of the present invention resides in that the light shielding material 50 layer formed on the upper surface of the opposing substrate 20 in its margin underlies the bonding material 40 layer. Due to this structure, leaked light indicated by the arrow (in FIG. 7) does not reach the bonding material 40. In the display device of FIG. 2, the light shielding material 50 is laid in contact with the upper surface of the opposing substrate 20. Leaked light from the backlight 200, as indicated by the arrow (in FIG. 7), can thus be prevented from being emitted through the upper surface of the opposing substrate 20. Hence, the viewer is unable to see the leaked light and can see an image being displayed satisfactorily. Leaked light is inhibited from entering the chamfered edges 31. For this purpose, the structure may involve tape attachment or print. Because light from the backlight, which is not shown, is blocked out by the light shielding material 50, the light from the backlight is unlikely to reach the chamfers 31 of the front window 30. Even if the light from the backlight reaches the surroundings of the chamfers 31 of the front window 30 through any path, this light is unlikely to enter the front window 30, because the boundary faces of the chamfers 31 are exposed to air, where there is a large difference in refractive index. Hence, no light enters a visual field from the surface of the front window 30.

In FIG. 2, the front window 30 is 0.8 mm thick and inhibits leaked light from entering the chamfers 31. For this purpose, the structure may involve tape attachment or print. Because light from the backlight, which is not shown, is blocked out by the light shielding material 50, the light from the backlight is unlikely to reach the chamfers 31 of the front window 30. Even if the light from the backlight reaches the surroundings of the chamfers 31 of the front window 30 through any path, this light is unlikely to enter the front window 30, because the boundary faces of the chamfers 31 are exposed to air, where there is a large difference in refractive index. Hence, no light enters a visual field from the surface of the front window 30.

In FIG. 2, the front window 30 is 0.8 mm thick and a chamfer dimension c is about 0.15 mm. As the light shielding material 50, a light shielding tape with an adhesive material can be used. Alternatively, the light shielding material 50 can be formed in required locations by print or the like. In this context, the adhesive material produces adhesiveness by applying pressure thereto and the boding material is initially liquid and cures under heating or UV irradiation, thus producing adhesiveness.

Figure 3:
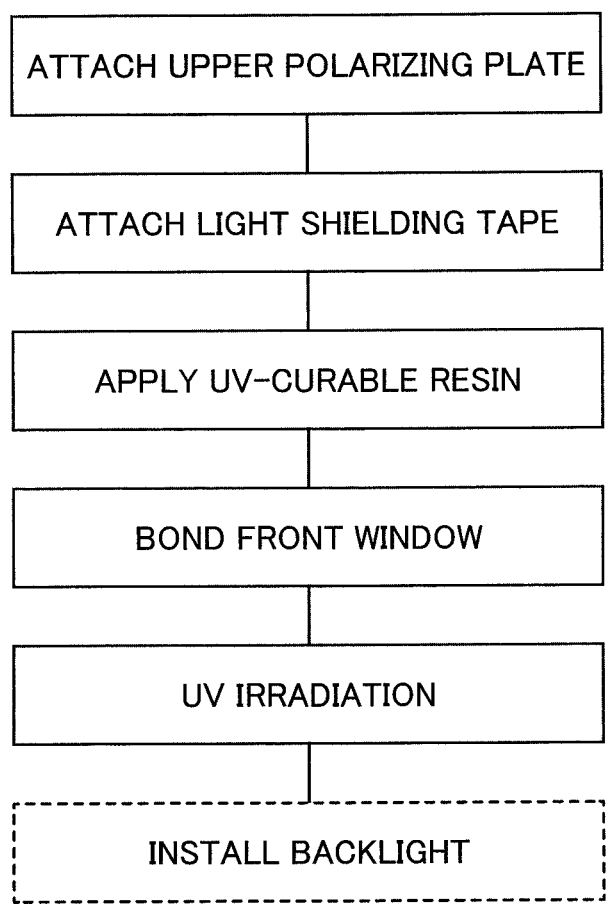
FIG. 3 is a diagram representing a fabrication flow of the liquid crystal display device of the first embodiment.

FIG. 3 is a process flow for forming a module as shown in FIG. 2. In FIG. 3, first, the upper polarizing plate 21 is attached to the opposing substrate 20 of the liquid crystal display panel. Then, a light shielding tape with an adhesive material is attached to the upper surface of the opposing substrate 20 with its one side abutting on the upper polarizing plate 21. Here, the light shielding tape with an adhesive material is the light shielding material 50. The light shielding tape and the upper polarizing plate are not necessarily in contact with each other.

Subsequently, a UV-curable resin 40, which is liquid, is applied on top of the upper polarizing plate 21 and the opposing substrate 20. This acrylic resin is characterized in that it is initially a liquid including an acrylic oligomer. Then, the front window 30 is bonded. After that, the bonding material 40 is caused to cure under UV irradiation. Subsequently, the backlight, which is not shown, is installed under the liquid crystal display panel.

An advantage of bonding the liquid crystal display panel and the front window 30 using the bonding material 40 resides in that the liquid crystal display panel and the front window 30 can be positioned while being modified, because the bonding material 40 is initially liquid. Once they have been positioned accurately, accurate assembly can be performed by causing the bonding material to cure under ultraviolet irradiation. Another advantage lies in that the UV-curable resin used as the bonding material 40 is less costly than the adhesive material.

Although it is preferable that the bonding material 40 dose not adhere to the chamfers 31, as in FIG. 2, some of the bonding material 40 may adhere to the chamfers 31, because the bonding material 40 is initially liquid. According to the present invention, light leakage can be prevented because of the presence of the light shielding material, even if the liquid bonding material adheres to the chamfers 31.

Although, in FIG. 1 and FIG. 2, the light shielding material 50 is laid along the side opposite to the terminal section, it may be more beneficial if the light shielding material 50 is also laid along other two sides where the front window 30 is smaller than the dimensions of the opposing substrate 20 or the TFT substrate 10. When a top frame, which is not shown in FIG. 2, is placed outside the front window 30, it is possible to reduce incoming external light through a lateral side of the front window 30. Even if external light enters the front window 30 through its lateral side, the light entered through the lateral side is fully reflected within the front window 30 and goes out through its opposite lateral side. Hence, the light entered through the lateral side is not emitted through the front surface of the front window and douse not impede the viewer's vision in seeing an image being displayed. According to this embodiment, it is possible to prevent light of the backlight from leaking into the front surface even in a case where the black matrix 22 is not formed to prevent peel-off of the sealing material in frame-like portions occupied by the sealing material.

Second Embodiment

Figure 4:
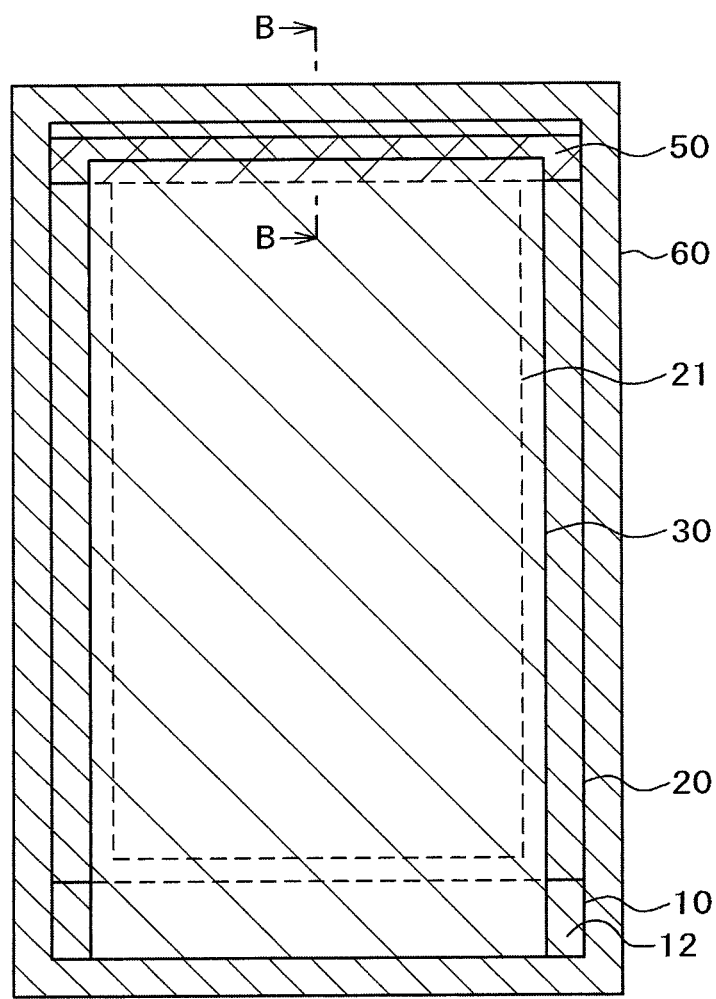
FIG. 4 is a plan view of a liquid crystal display device of a second embodiment.
Figure 5:
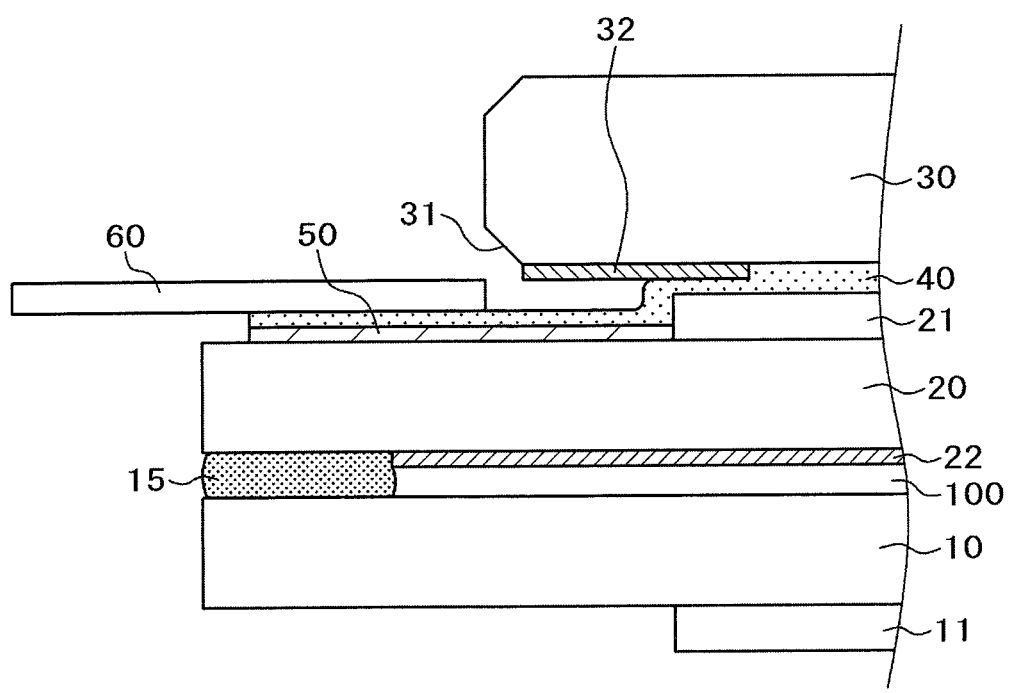
FIG. 5 is a cross-sectional view through line B-B in FIG. 4.

FIG. 4 is a plan view of a liquid crystal display device according to a second embodiment of the present invention and FIG. 5 is a cross-sectional diagram through line B-B in FIG. 4. In FIG. 4, a difference from FIG. 1 is that a (frame-like) light shielding tape 60 shaped for marginal edges is formed around the front window 30. The inner edges of the light shielding tape 60 shaped for marginal edges coincide with the outer edges of the front window 30. Other structural details are the same as those in FIG. 1.

FIG. 5 is a cross-sectional diagram through line B-B in FIG. 4. FIG. 5 differs from FIG. 2 in that the light shielding tape 60 shaped for marginal edges is formed around the front window 30. The inner edges of the light shielding tape 60 shaped for marginal edges coincide with the outer edges of the front window 30. The light shielding tape 60 shaped for marginal edges serves to block out light from the backlight that is leaked from the edge portions of the opposing substrate 20 not covered by the light shielding material 50 or light from the backlight that enters the opposing substrate 20 from outside. Accordingly, it is possible to prevent light leakage in the periphery of the front window 30.

As is the case for FIG. 2, the bonding material 40 is not formed in the vicinity of the chamfered edges 31 of the front window 30. Even if light of the backlight leaks in the vicinity of the chamfers 31 of the front window 30, the light is unlikely to enter the internal part of the front window 30 through the chamfered edges 31, due to a difference in refractive index between the chamfered edges 31 and air. Accordingly, it is possible to prevent light leakage of this light in the margins of the screen.

Figure 6:
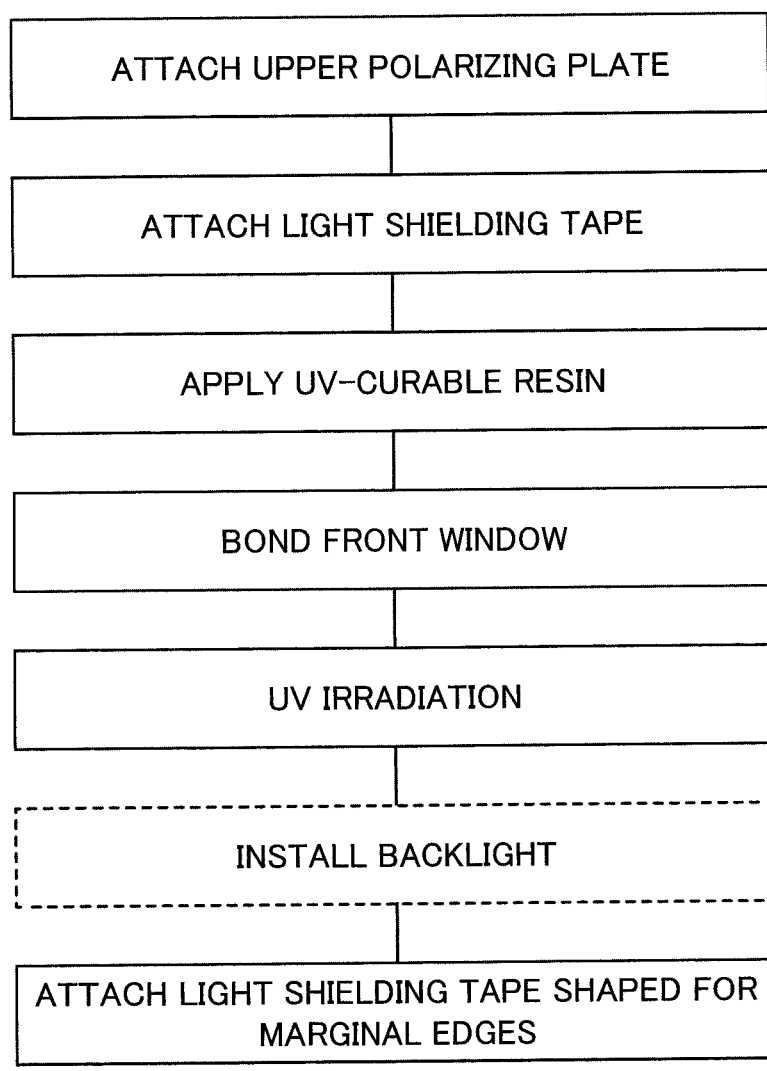
FIG. 6 is a diagram representing a fabrication flow of the liquid crystal display device of the second embodiment.

FIG. 6 is a flow representing a fabrication process of the liquid crystal display device of FIG. 4 and FIG. 5, which is the second embodiment. Earlier steps up to UV irradiation are the same as in the flow shown in FIG. 3. Subsequently, the backlight, which is not shown in FIG. 5, is similarly installed. In FIG. 6, the following step is placing the light shielding tape 60 shaped for marginal edges around the liquid crystal display panel in a position that is flush with the edges of the front window 30. The light shielding tape 60 shaped for marginal edges is a light blocking PET film and its thickness including an adhesive material is about 80 μm.

In this embodiment, it is possible to shield light from the backlight traveling through the margins of the opposing substrate 20 and it is also possible to prevent light that passes through the outermost portions not covered by the light shielding material 50 and light transmitted outside the opposing substrate 20. Therefore, it is possible to prevent light leakage in the margins of the screen even better than the case of the first embodiment.

Third Embodiment

Figure 7:
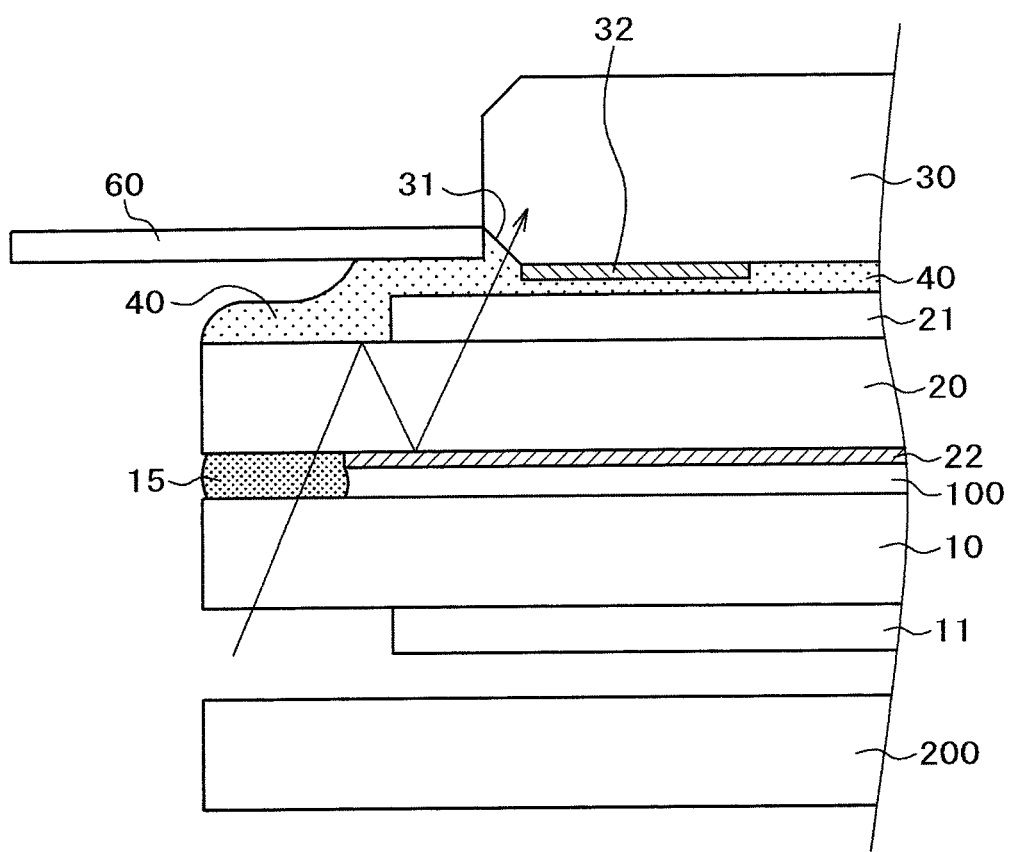
FIG. 7 is a cross-sectional view representing an example of a conventional liquid crystal display device having a front window.
Figure 8:
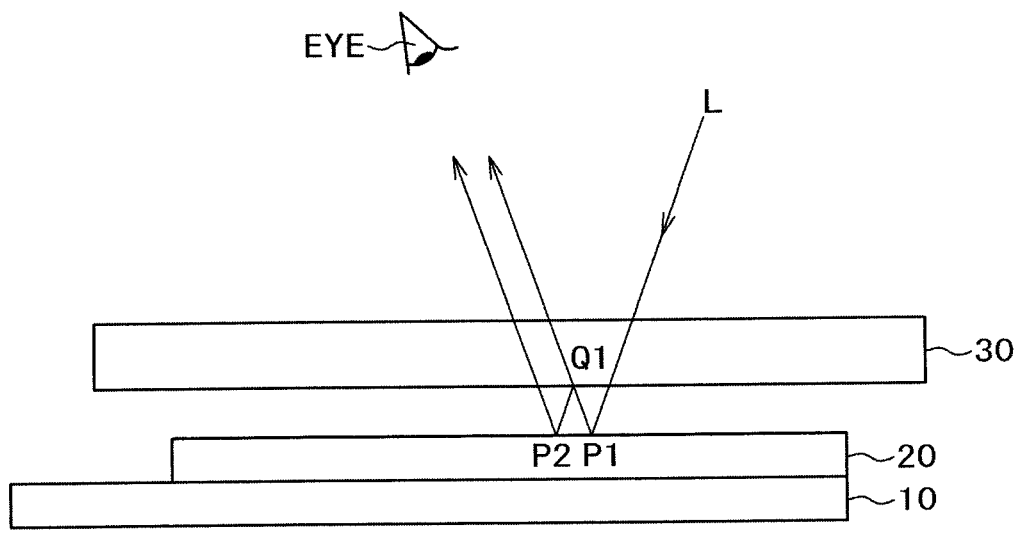
FIG. 8 is a cross-sectional view of a liquid crystal display device having a front window.
Figure 9:
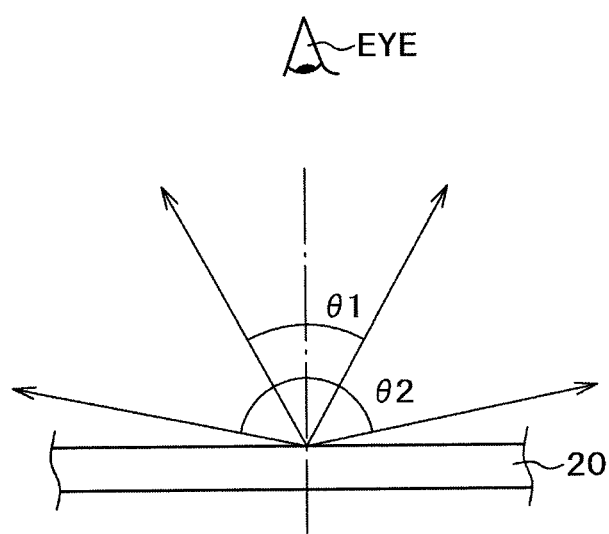
FIG. 9 is a schematic diagram for defining viewing angles.
Figure 10:
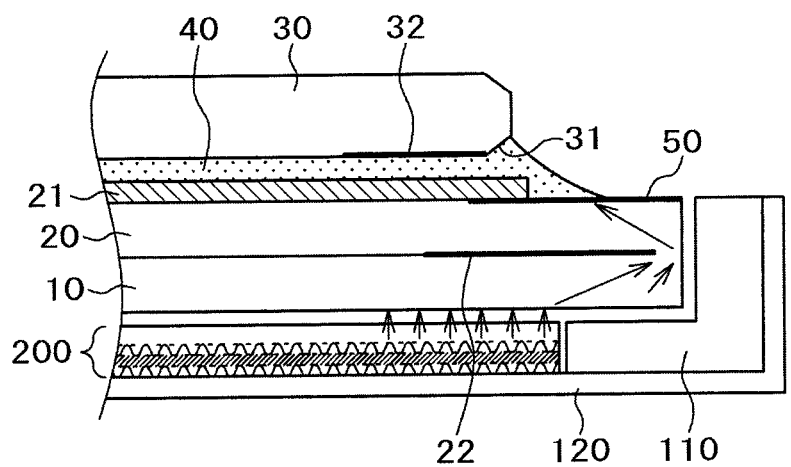
FIG. 10 is a cross-sectional view of a liquid crystal display device of a third embodiment.

FIG. 10 is a cross-sectional view representing another embodiment of the present invention. In FIG. 10, the liquid crystal display panel and the backlight 200 are accommodated within a mold 110 and this mold 110 is accommodated with the bottom frame 120. In FIG. 2, FIG. 5, FIG. 7, etc. the mold 110 is excluded for convenience sake. In this embodiment, by providing the light shielding material 50 directly on the upper surface of the opposing substrate 20 in its margins, light from the backlight 200, as indicated by an arrow, is prevented from being emitted through the upper surface of the opposing substrate 20.

A major difference between this embodiment and the preceding embodiments is that the light shielding material 50 is attached below the polarizing plate 21. In addition, the light shielding material 50 and the polarizing plate 21 are placed overlapping each other. The light shielding material 50 may be provided by tape attachment or print in the structure. In order to reduce a level difference in a portion where the polarizing plate 21 is attached to the surface, it is preferable to provide a print form of the light shielding material. Further, the light shielding tape 60 may be laid to cover the light shielding material 50 and the bonding material 40. By configuring the display device in this way, it is possible to prevent light leakage because of the presence of the light shielding material, even if a liquid bonding material adheres to the chamfered edges 31.

What is claimed is:

1. A liquid crystal display device comprising a liquid crystal display panel that includes a TFT substrate having a matrix arrangement of pixel electrodes and TFTs for controlling signals to the pixel electrodes and an opposing substrate having color filters formed corresponding to the pixel electrodes, the TFT substrate being formed larger than the opposing substrate and a terminal section being formed in a portion where the opposing substrate does not extend over the TFT substrate, wherein an upper polarizing plate is directly bonded to the opposing substrate of the liquid crystal display panel and a light shielding material is formed between the opposing substrate and a front window and laid along a periphery of the upper polarizing plate and along and outside of a peripheral edge of a side of the upper polarizing plate at a position which is opposite to the terminal section;

wherein the front window is formed over the upper polarizing plate and all peripheral edges of the upper polarizing plate are located inward of all peripheral edges of the front window;

wherein the upper polarizing plate and the front window are directly bonded with a bonding material made from an ultraviolet curable resin;

wherein the ultraviolet curable resin lies over the light shielding material; and wherein chamfers are formed in the front window and the bonding material does not adhere to the chamfers.

2. The liquid crystal display device according to claim 1, wherein the ultraviolet curable resin is initially a liquid including an acrylic oligomer.

3. The liquid crystal display device according to claim 1, wherein the light shielding material is formed by a light shielding tape with an adhesive material.

4. The liquid crystal display device according to claim 1, wherein the upper polarizing plate and the light shielding tape abut each other.

5. The liquid crystal display device according to claim 1, wherein a light shielding tape shaped for marginal edges is formed along and outside the peripheral edges of the front window and above the light shielding material; and wherein the peripheral edges of the light shielding tape shaped for marginal edges are located outward of the peripheral edges of the opposing substrate.

6. A liquid crystal display device comprising a liquid crystal display panel that includes a TFT substrate having a matrix arrangement of pixel electrodes and TFTs for controlling signals to the pixel electrodes and an opposing substrate having color filters formed corresponding to the pixel electrodes; and a backlight placed in back of the liquid crystal panel, wherein an upper polarizing plate and a light shielding material are placed on the opposing substrate of the liquid crystal display panel and the light shielding material is formed between the opposing substrate and a front window and laid along a periphery of the upper polarizing plate;

wherein the front window is placed over the upper polarizing plate, and the upper polarizing plate and the front window are directly bonded with an ultraviolet curable resin;

wherein the ultraviolet curable resin extends over at least a portion of a surface of the upper polarizing plate opposite to a surface of the front window, covers a peripheral edge of the surface of the upper polarizing plate, and extends beyond the peripheral edge of the surface of the upper polarizing plate; and wherein the light shielding material is laid between the ultraviolet curable resin which extends beyond the peripheral edge of the surface of the upper polarizing plate and the opposing substrate.

7. The liquid crystal display device according to claim 6, wherein a frame-like light shielding tape is placed in the marginal edges of the opposing substrate and on top of the ultraviolet curable resin.

* * * * *